United States Patent [19]
Pancotti

[11] Patent Number: 5,181,829
[45] Date of Patent: Jan. 26, 1993

[54] HELICOPTER BLADE

[75] Inventor: Santino Pancotti, Gallarate, Italy

[73] Assignee: Agusta S.p.A., Samarate, Italy

[21] Appl. No.: 681,135

[22] Filed: Apr. 5, 1991

[30] Foreign Application Priority Data

Apr. 6, 1990 [IT] Italy ............................... 67 260 A/90

[51] Int. Cl.⁵ ............................................ B64C 27/48
[52] U.S. Cl. ............................... 416/134 A; 416/141; 416/226; 416/230
[58] Field of Search ............. 416/134 A, 141, 226, 416/229 R, 230, 244 R

[56] References Cited

U.S. PATENT DOCUMENTS

| | | | |
|---|---|---|---|
| 3,476,484 | 11/1969 | Brunsch | 416/230 A |
| 3,810,713 | 5/1974 | Joiner | 416/141 |
| 4,012,169 | 3/1977 | Mouille et al. | 416/134 A |
| 4,251,309 | 2/1981 | Class et al. | 416/134 A |
| 4,297,078 | 10/1981 | Martin | 416/134 A |
| 4,306,836 | 12/1981 | Mayerjak | 416/141 |
| 4,455,123 | 6/1984 | Sanders et al. | 416/134 A |
| 4,568,246 | 2/1986 | Hibyan et al. | 416/230 A |
| 4,696,623 | 9/1987 | Bost | 416/226 |
| 4,728,263 | 3/1988 | Basso | 416/230 |

Primary Examiner—Edward K. Look
Assistant Examiner—James A. Larson
Attorney, Agent, or Firm—Kane, Dalsimer, Sullivan, Kurucz, Levy, Eisele and Richard

[57] ABSTRACT

A helicopter blade having a connecting device made of composite synthetic material for connecting it to the hub of a rotor via a spherical joint comprising a rod housed inside a tubular portion of the connecting device; the rod being connected to the tubular portion by two diametrical through bolts offset along the rod, and the connecting device comprising, for each of the four holes engaged by the aforementioned bolts, a substantially axial strap of composite material looped about the respective hole.

5 Claims, 5 Drawing Sheets

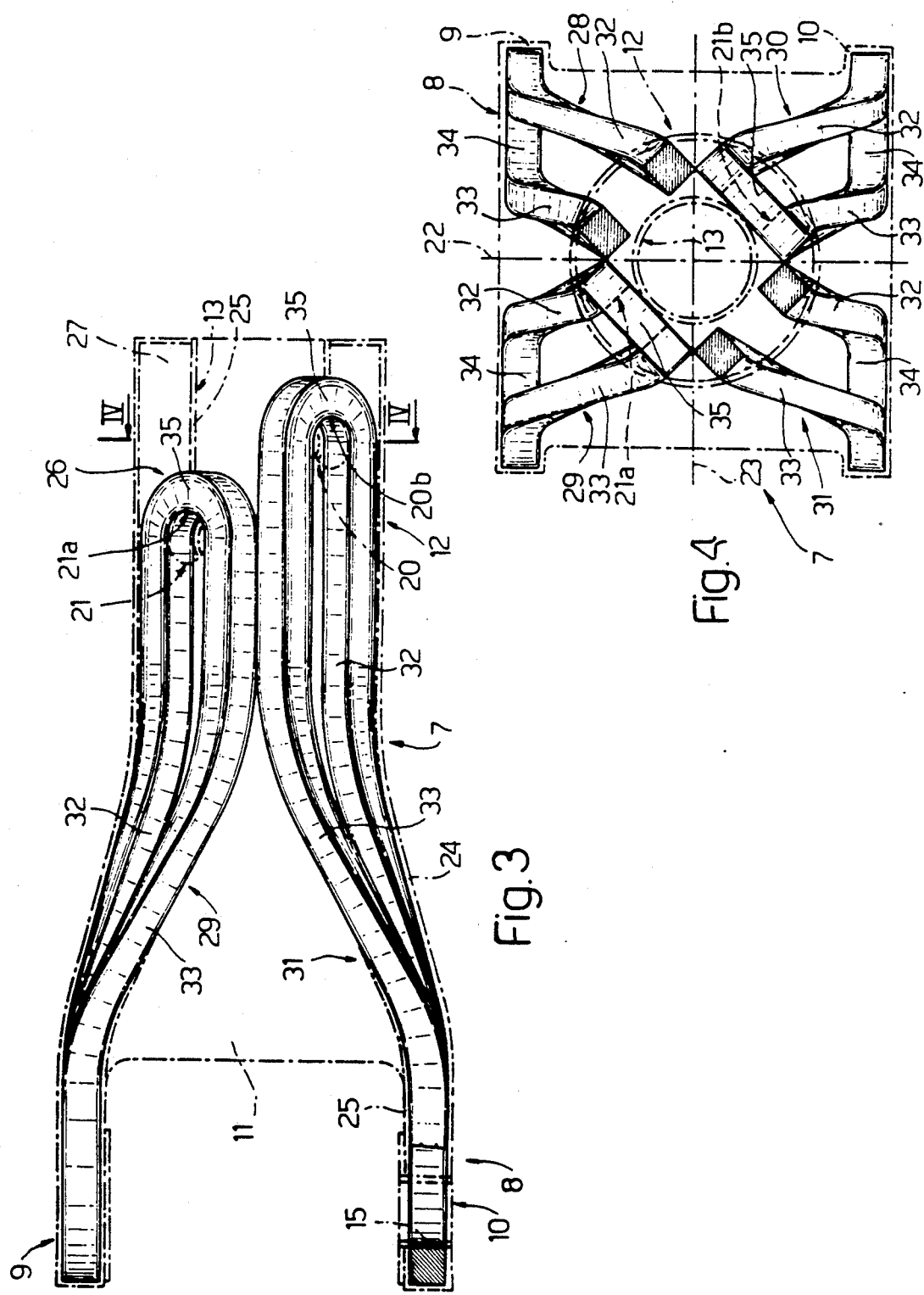

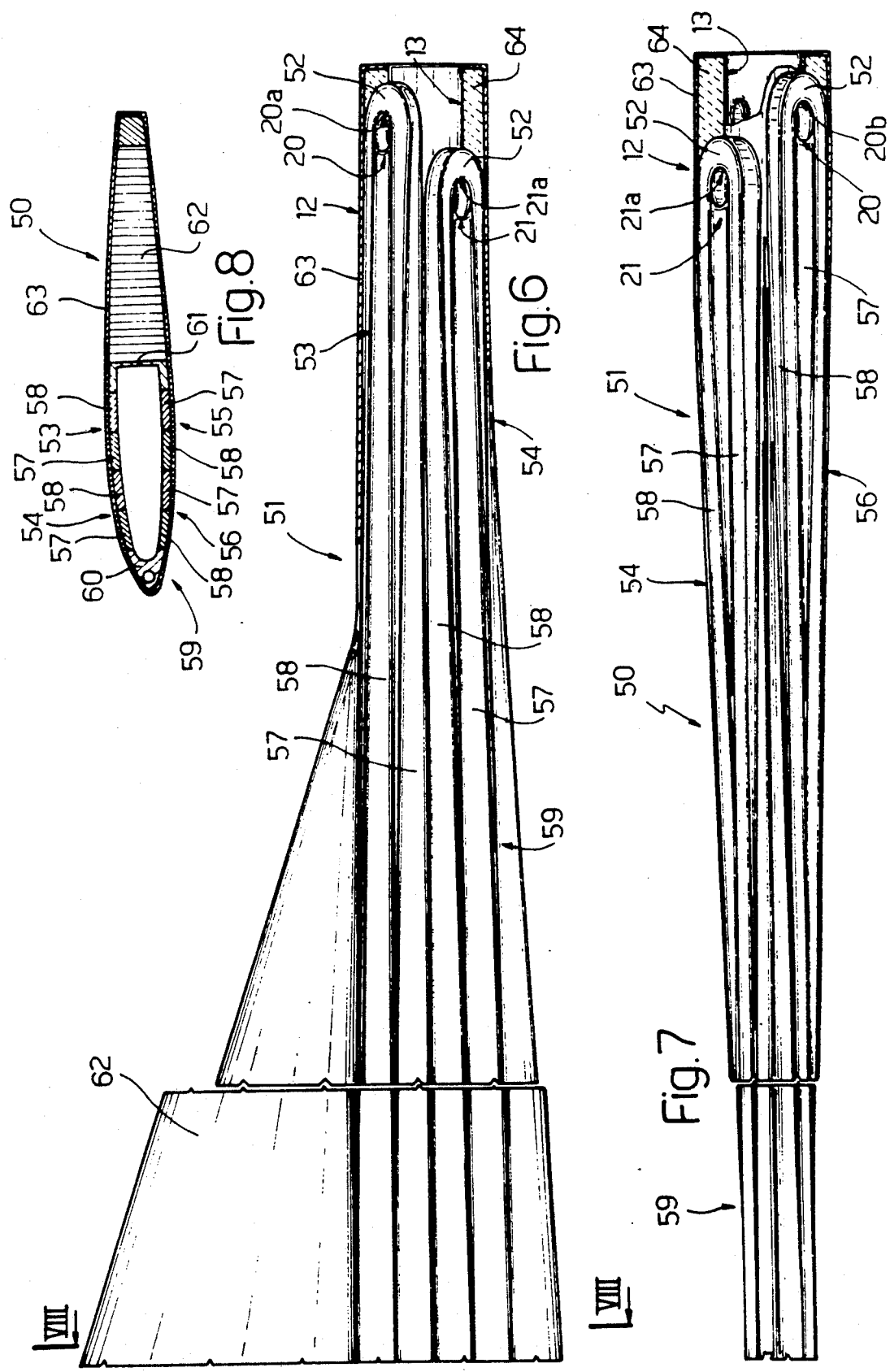

HELICOPTER BLADE

BACKGROUND OF THE INVENTION

The present invention relates to a helicopter blade. In particular, the present invention relates to a helicopter blade comprising a connecting device for connecting the blade to the hub of the rotor by means of a spherical joint defined by two mating elements respectively in the form of a spherical head and a spherical seat, and wherein one of said mating elements forms an integral part of the connecting device.

One of the most structurally critical points on blades of the aforementioned type is on the connecting device, and corresponds to the point at which the blade, particularly the connecting device, is connected to said integral mating element.

SUMMARY OF THE INVENTION

The aim of the present invention is to provide a helicopter blade designed to ensure reliable connection of said mating element to the blade.

With this aim in view, according to the present invention, there is provided a helicopter blade comprising a connecting device for connecting the blade to the hub of the rotor, characterised by the fact that said connecting device is made of composite synthetic material, and comprises a tubular end portion and first means for connecting said tubular portion to the hub; said first connecting means comprising a rod housed inside said tubular portion and connected to the same by two first diametrical through pin means offset along said rod and each engaging a pair of first holes formed through said tubular portion; said connecting device comprising, for each said first hole, a substantially axial strap of synthetic fiber material looped about said first hole.

According to a first preferred embodiment of the present invention, the blade is foldable and comprises two releasably connected portions, one of which consists of said connecting device; said blade comprising a root portion; said connecting device comprising two second pin means parallel to each other and extending through said root portion, and a fork-shaped portion housing said root portion and having two pairs of second through holes for respective said second pin means; and said straps being loop-shaped and each looped about a respective said second hole.

According to a further preferred embodiment of the present invention, the blade is rigid; the connecting device constitutes an integral portion of the blade; and the blade comprises a spar of composite synthetic material; each strap comprising two branches extending along said blade from said respective first hole so as to form said spar.

BRIEF DESCRIPTION OF THE DRAWINGS

A number of non-limiting embodiments of the present invention will be described by way of examples with reference to the accompanying drawings, in which:

FIG. 3 shows a side view of the FIG. 2 detail, with parts removed for simplicity;

FIG. 4 shows a section along line IV—IV in FIG. 3;

FIG. 6 shows a partially sectioned, partial side view of a second embodiment of the blade according to the present invention;

FIG. 7 shows a partially sectioned plan view of the FIG. 6 blade with parts removed for simplicity;

FIG. 8 shows a section along line VIII—VIII in FIG. 6.

DETAILED DESCRIPTION OF THE INVENTION

Figure 1:
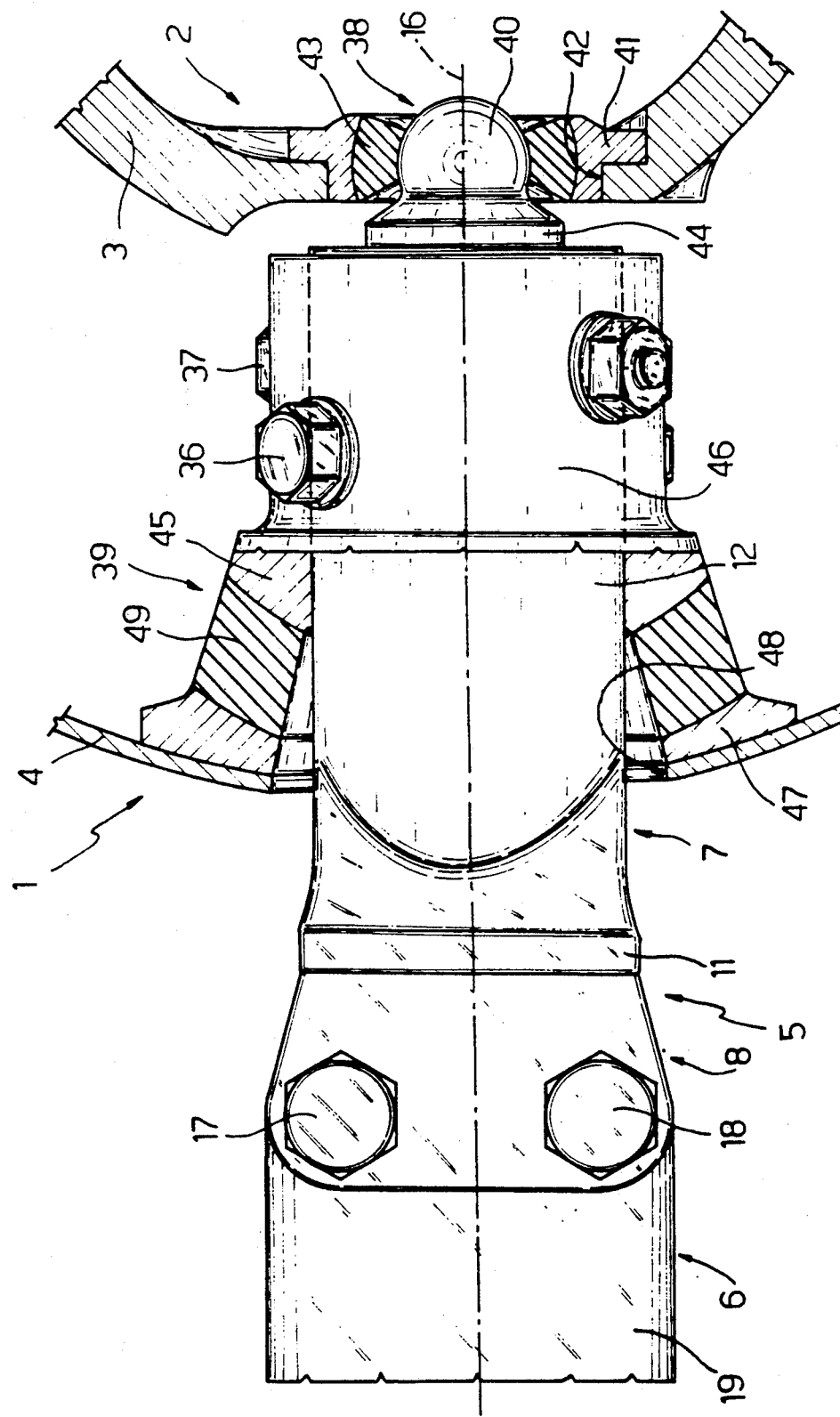
FIG. 1 shows a partial plan view of a first embodiment of the blade according to the present invention and as mounted on the hub.

Number 1 in FIG. 1 indicates a helicopter rotor comprising a hub 2 integral with a drive shaft (not shown) and comprising a substantially cylindrical central body 3 and an annular peripheral body 4 coaxial and angularly integral with each other, so as to rotate about their axis together with said drive shaft.

Hub 2 is fitted with a number of blades 5 projecting substantially radially outwards from hub 2, and each consisting of a foldable blade comprising two releasably connected portions 6 and 7. Portion 6 consists of the actual blade, and portion 7 of a connecting element for connecting blade 6 to hub 2.

As shown in FIGS. 1 and 3, connecting element 7 comprises a fork 8 consisting of two parallel, facing plates 9 and 10 extending outwards form the opposite lateral ends of a tapered head 11 on the end of a substantially cylindrical, tubular rod 12 coaxial with head 11. On the end opposite that fitted with fork 8, rod 12 presents an axial dead hole 13.

Each plate 9 and 10 presents two through holes 14 and 15 (FIG. 2) perpendicular to the axis 16 of rod 12 and coaxial with holes 14 and 15 in the other plate 10 and 9. Said two pairs of holes 14 and 15 are engaged by respective bolts 17 and 18, which engage respective holes (not shown) through a root portion 19 of rigid blade 6 housed between plates 9 and 10 of fork 8.

Rod 12 presents another two through holes 20 and 21 intersecting dead hole 13 and divided by the same into two pairs of holes 20a, 20b and 21a, 21b. Holes 20 and 21 are perpendicular to each other and to axis 16, intersect axis 16 at two points offset in relation to each other, and form 45° angles with two perpendicular planes 22 and 23 intersecting axis 16 (FIG. 4) and of which plane 22 is parallel to holes 14 and 15.

Figure 2:
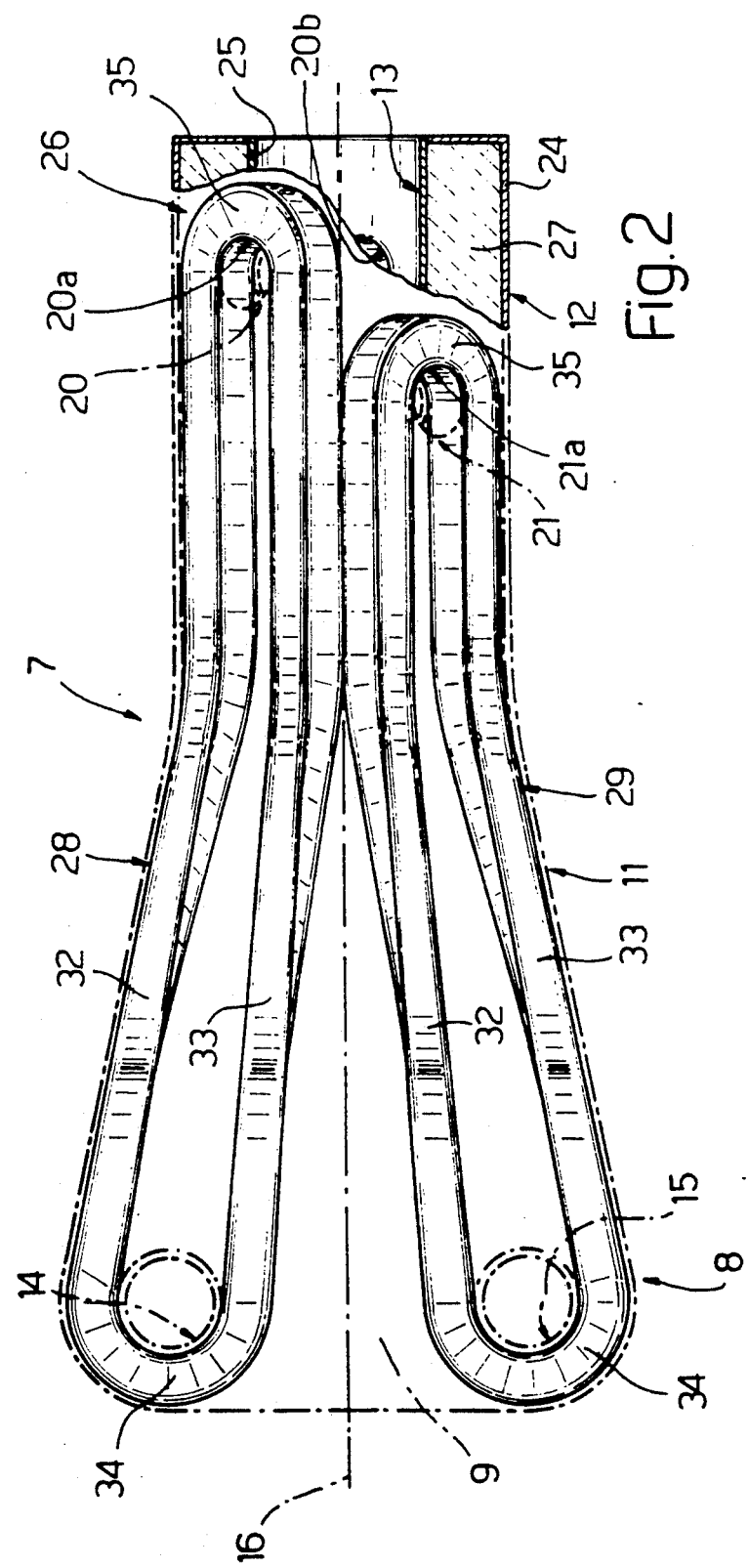
FIG. 2 shows a partially sectioned plan view, with parts removed for simplicity, of a detail on the FIG. 1 blade.

As shown in FIGS. 2 and 3, connecting element 7 is made of composite synthetic material, and comprises a tubular outer casing 24 and a tubular inner casing 25. Casings 24 and 25 are made of composite material reinforced with crosswise fibers, and define a volume occupied partially by a supporting structure or skeleton 26, and the remainder of which is occupied by synthetic filler 27.

Figure 5:
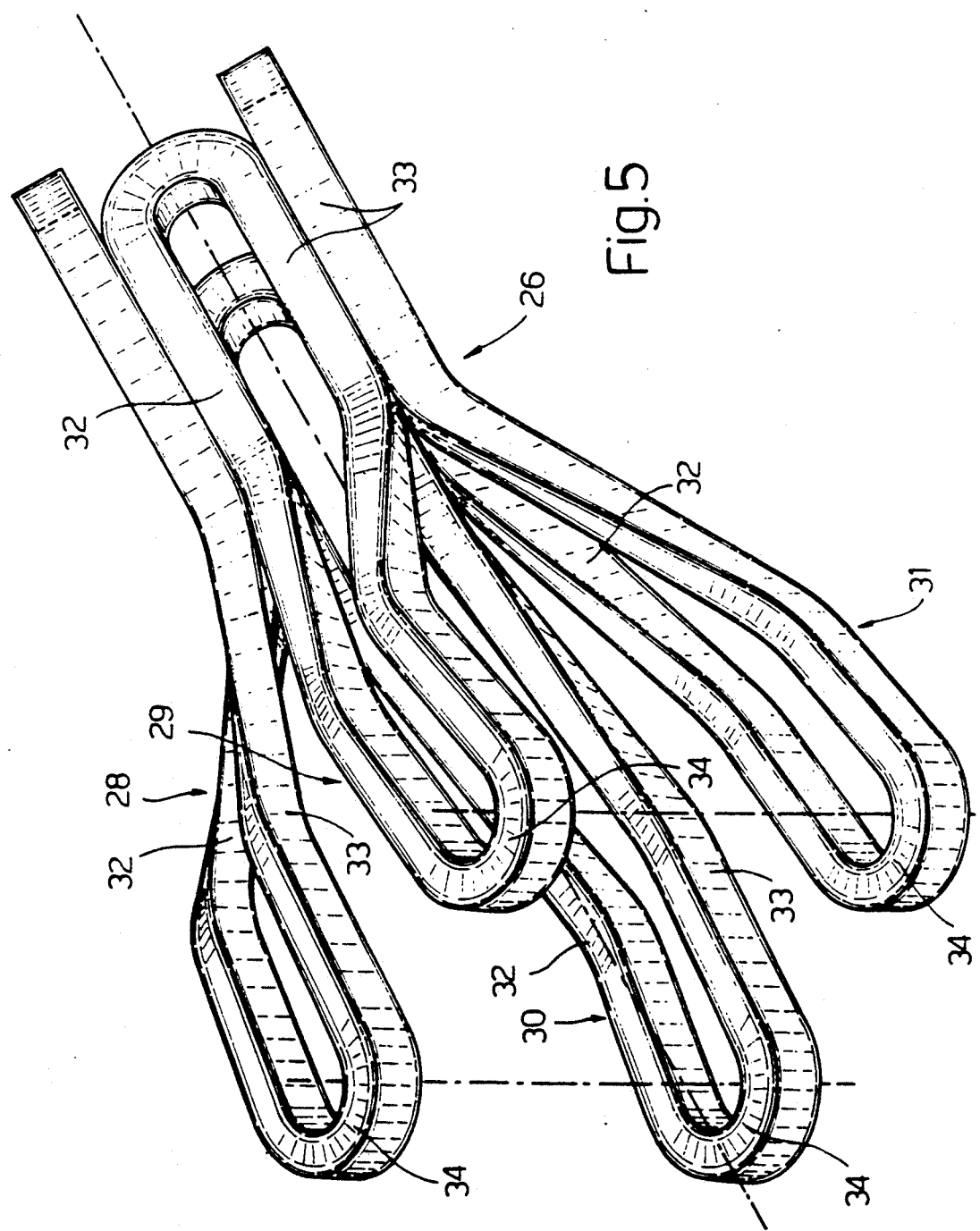
FIG. 5 shows a view in perspective of a detail in FIG. 2.

As shown in FIG. 5, skeleton 26 comprises four loop-shaped straps 28, 29, 30 and 31, each preferably consisting of a skein or strip of graphite, and extending substantially longitudinally along element 7 with a 45° twist about its axis between one end and the other. In particular, each of straps 28 to 31 presents two substantially parallel, longitudinal branches 32 and 33, the ends of which are connected by two curved end portions 34 and 35 looped respectively about one of holes 14 and 15 and one of holes 20 and 21. In particular, each of straps 28 to 31 is looped about a first hole 14 or 15 and about a second hole consisting of whichever of holes 20 or 21 is located, as shown in FIG. 4, on the same side as said first hole in relation to planes 22 and 23. As shown in FIG. 1, rod 12 is fitted, by means of two through bolts 36 and 37 engaging holes 20 and 21, with the inner shoes of two elastomeric bearings 38 and 39 forming part of connecting element 7 and respectively enabling connection of blade 5 to central body 3 and to peripheral body 4 of hub 2.

In particular, the inner shoe of bearing 38 consists of a spherical head 40 fitted through a ring 41 housed inside a hole 42 through central body 3. Ring 41 presents a spherical-ring-shaped inner seat concentric with head 40 and connected to the same via the interposition of a layer 43 of reinforced elastomeric material. Head 40 is integral with the end of a metal rod 44 housed inside hole 13 and having two diametrical through holes (not shown) coaxial with holes 20 and 21 and engaged by bolts 36 and 37.

The inner shoe of bearing 39 consists of an annular body 45 on the end of a coupling 46 fitted on to rod 12 and having two diametrical holes (not shown) engaged by bolts 36 and 37, which therefore provide for securing rod 44 and coupling 46 to each other and to rod 12.

In addition to annular body 45, bearing 39 comprises an outer annular shoe 47 integral with peripheral body 4. Show 37 surrounds a hole 48 formed through peripheral body 4 and engaged by rod 12, and is connected to annular body 45 via the interposition of a layer 49 of elastomeric material.

Skeleton 26 of blade 5 as described above surrounds holes 14 and 15 on one side and holes 20 and 21 on the other, for reinforcing all the critical points and maximizing the resistance of connecting element 7 for a given weight. Moreover, by virtue of casings 24 and 25 and the substantially independent nature of straps 28 to 31, failure of one of the straps does not necessarily result in collapse of connecting element 7.

The FIG. 6 to 8 variation relates to a so-called "integrated" blade 50 comprising, at one end, a root portion 51 integral with blade 50 and corresponding, when provided with bearings 38 and 39 (not shown), to connecting element 7 on blade 5.

As on connecting element 7, root portion 51 forms a tubular rod 12 having a dead axial end hole 13 for receiving rod 44 with spherical head 40, and holes 20 and 21 engaged by bolts 36 and 37.

As on connecting element 7, holes 20 and 21 are surrounded by curved portions 52 of respective straps 53, 54, 55 and 56, each comprising two longitudinal branches 57 and 58 joined by a respective curved portion 52.

As shown particularly in FIG. 8, root portion 51 of blade 50 is the end portion of a spar 59 defined by four top straps consisting of side by side branches 57 and 58 of straps 53 and 54; four bottom straps consisting of side by side branches 57 and 58 of straps 55 and 56; a connecting element 60; and a rear cover element 61, the rear outer surface of which is fitted with a tapered honeycomb element 62. Spar 59 and element 62 are enclosed in a tubular outer casing 63 made of composite material reinforced with crosswise fibers, and folded over hole 13 and about filler material 64 for filling the portions of root portion 51 not occupied by straps 53 to 56.

I claim:

1. A helicopter blade (5)(50) comprising a connecting device (7)(51) for connecting the blade (5)(50) to a hub (2) of a rotor (1); the connecting device (7)(51) being made of composite synthetic material, and comprising a tubular end portion (12) and first and second connecting means (38)(39) for connecting said tubular portion (12) to the hub (2); said first connecting means (38) comprising a rod (44) housed inside said tubular portion (12), and two first diametrical through pin means (36, 37) offset along said rod (44) and each engaging a pair of first holes (20a, 20b)(21a, 21b) formed through said tubular portion (12) for connecting the rod (44) to the tubular portion (12); the second connecting means (39) comprising a tubular body (46) coaxial with and fitted on to the tubular portion (12) with said first pin means (36, 37) extending through the tubular body (46); and the connecting device further comprising, for each said first hole (20a, 20b)(21a, 21b), a substantially axial strap (28, 29, 30, 31) (53, 54, 55, 56) of synthetic fiber material looped about said first hole (20a, 20b)(21a, 21b).

2. A blade as claimed in claim 1, wherein said first pin means (36, 37) are perpendicular to one another.

3. A blade as claimed in claim 1,
the blade (5) being foldable and comprising two releasably connected portions (6, 7), one of which consists of said connecting device (7); the blade comprising a root portion (19); said connecting device (7) comprising two second pin means (17, 18) parallel to each other and extending through said root portion (19), and a fork-shaped portion (8) housing said root portion (19) and having two pairs of second through holes (14, 15) for respective said second pin means (17, 18); characterised by the fact that said straps (28, 29, 30, 31) are loop-shaped and each looped about a respective said second hole (14)(15).

4. A blade as claimed in claim 3, characterised by the fact that each said first pin means (36, 37) forms a substantially 45° angle in relation to said second pin means (17, 18).

5. A blade as claimed in claim 1, the blade (50) being rigid; said connecting device (51) constituting an integral portion of said blade (50); and said blade (50) comprising a spar (59) made of composite synthetic material; characterised by the fact that each said strap (53, 54, 55, 56) comprises two branches (57, 58) extending from said respective first hole (20, 21) along said blade (50) and forming said spar (59).

* * * * *